United States Patent
Mock

(12) United States Patent    (10) Patent No.: US 6,487,327 B1
(45) Date of Patent: Nov. 26, 2002

(54) OPTICAL FIBER CONNECTOR MONITOR APPARATUS

(75) Inventor: Joel Leslie Mock, Norcross, GA (US)

(73) Assignee: Fitel USA Corp., Norcross, GA (US)

( * ) Notice: Subject to any disclaimer, the term of this patent is extended or adjusted under 35 U.S.C. 154(b) by 37 days.

(21) Appl. No.: 09/586,851

(22) Filed: Jun. 5, 2000

(51) Int. Cl.[7] ............................................... G02B 6/00
(52) U.S. Cl. .............................. 385/12; 385/88; 385/92
(58) Field of Search .......................... 385/53, 88, 712, 385/12, 92

(56) References Cited

U.S. PATENT DOCUMENTS

| | | | |
|---|---|---|---|
| 5,005,005 A | * 4/1991 | Brossia et al. | 340/604 |
| 5,222,164 A | * 6/1993 | Bass, Sr. et al. | 385/14 |
| 5,377,283 A | * 12/1994 | Blake et al. | 385/11 |
| 5,396,569 A | * 3/1995 | Yanagawa et al. | 385/24 |
| 5,461,693 A | * 10/1995 | Pimpinella | 385/135 |
| 5,959,293 A | * 9/1999 | Ishikawa | 250/227.14 |

\* cited by examiner

*Primary Examiner*—Neil Abrams
*Assistant Examiner*—Brian S. Webb
(74) *Attorney, Agent, or Firm*—Thomas, Kayden, Horstemeyer & Risley, LLP

(57) ABSTRACT

An optical fiber connection monitor has a detector adjacent the connection which detects light scattered from the connection. The detector signal is converted to a voltage and applied to a comparator circuit which gives an indication that the connection is not dangerously emitting radiation or an indication that it is dangerously emitting radiation. In another embodiment of the invention, a finite amount of light is fed from the end or ends of the ferrule or ferrules of the connection components to the detector to insure that the monitor circuitry is functioning properly in the presence of optical signals. A further embodiment includes passing light past the ferrule end to the detector, further checking the operation of the monitor system.

13 Claims, 4 Drawing Sheets

OPTICAL FIBER CONNECTOR MONITOR APPARATUS

FIELD OF THE INVENTION

This invention relates to an apparatus for monitoring optical fiber connections, and, more particularly, for ascertaining stray optical radiation from the connector and surrounding neighborhood.

BACKGROUND OF THE INVENTION

In optical fiber connection systems, essential components of virtually all such systems are fiber connectors which transmit optical energy from one fiber end to another, or to other active or passive devices. Such connections bear directly upon the amount of optical energy transmitted, and, as a consequence, there are numerous prior art arrangements for monitoring the amount of energy transmitted by and through a connection. For instance, in U.S. Pat. No. 5,793,909 of Leone et al. there is shown an optical monitoring and test access module for use in an optical fiber distribution frame or cross-connect frame having a multiplicity of fiber connects. The module monitors the optical signal level in a fiber line by tapping off a part of the signal and converting it to an electrical signal which, through subsequent processing, generates control signals when the power level of the received signal reaches certain specified levels. In U.S. Pat. No. 5,461,693 of Pimpinella there is shown an arrangement which launches test signals through a jumper cable from one connector module to another module connected to the first module by the jumper cable and which includes means for receiving and monitoring the test signal. In some arrangements, the receiving optical fiber, for example, is disconnected from its remote destination and connected to a power monitor which then monitors the signals, most often a test signal being transmitted. Such an arrangement requires an interruption in service, which is highly undesirable. On the other hand, the systems of the aformentioned patent to Leone et al. does not require service interruption, but does require extracting at least some of the transmitted power. Thus, most of the prior art arrangements are invasive in that they require presence of a signal through the connections being tested and operate by extracting some of the signal. In addition, such systems generally rely on bulk optics, complex circuitry, and, in many cases, require signal splitters, which, when used, impart unidirectionality to the monitor circuit.

Most prior art circuits are concerned with power monitoring or fault finding, or both. There is, however, in addition to these desiderata, another parameter which needs to be monitored, not only for efficiency of power transmission, but for safety for personnel in the vicinity of the connection or connections being monitored.

The connectors used in, for example, joining fiber ends have, as their primary function, the maintenance of the fiber ends in a butting relationship such that the core of one of the fibers is axially aligned with the core of the other fiber so as to maximize light transmission from one fiber to the other. Such alignment is extremely difficult to achieve, which is understandable when it is recognized that the mode field diameter of, for example, a single mode fiber is approximately nine microns (9, $\mu$m or 0.009 mm.) Good alignment of the fiber ends (low insertion loss) is a function of the alignment, the width of the gap (if any) between the fiber ends, and the surface condition of the fiber ends, all of which, in turn are inherent in the particular connector design. In the present day state of the art there are numerous, different connector designs in use for achieving low insertion loss and stability. In most of these designs, a pair of ferrules (one in each connector), each containing an optical fiber end, are butted together end to end and light travels across the junction. Zero insertion loss requires that the fibers in the ferrules be exactly aligned, a condition that, given the necessity of manufacturing tolerances, and cost considerations, is virtually impossible to achieve except by fortuitous accident. In U.S. patent application Ser. No. 09/363,906 of Andrews et al., filed Jul. 28, 1999, which issued as U.S. Pat. No. 6,287,018 on Sep. 11, 2001, the disclosure of which is incorporated herein by reference, there is shown a connector which is tunable for achieving maximum possible signal transmissivity or minimum insertion loss. The ferrule-barrel assembly of that connector is incrementally rotatable to any of a plurality of positions which, when rotated by means of a special tool, places the connector configuration in the best possible position for transmission.

Even though insertion loss is reduced for the particular connector being tuned, especially when mated with a similarly tuned connector, there almost invariably remains a certain amount of ferrule (or fiber within the ferrule) central axis offset and, consequently, light scattering at the junction of the two ferrules which can produce a dangerous condition for personnel in the vicinity. This scattering can be especially great where the connectors are not tuned, or where the mismatch is particularly bad. As is most often the case, there will be a plurality of connectors mounted in jack housings, or receptacles which are panel mounted, as shown in U.S. Pat. No. 5,274,729 of King et al. and, where several connectors are mismatched sufficiently to produce light scattering, the light radiation, which is cumulative, can be quite dangerous.

SUMMARY OF THE INVENTION

The present invention comprises an apparatus and circuitry for non-invasively monitoring the amounts of scattered radiation from one or more connectors, and for indicating when a potentially dangerous condition exists.

In greater detail, the connector jack housing has a photodiode mounted thereon for detecting the presence of scattered light and producing an electrical signal indicative thereof, the signal being proportional to the amount of light scattering. In a first embodiment of the invention, circuitry, which may be mounted on a small printed wiring board, converts the electrical current from the photodiode to a voltage which can then be applied to a suitable signaling device, such as an LED. The circuitry includes a comparator which has a reference voltage level to which the voltage from the photo-diode is compared. A first LED, which may emit a green light, for example, is lit as long as the comparator level is not exceeded. If the comparator level is exceeded, the green LED is deactivated and a red LED lights up, indicating either a line in use or a dangerous level of scattered light. Instead of the red LED, or in addition thereto, in extreme cases, the comparator output can be used to deactivate the faulty connection. The arrangement is bi-directional in that if either cable, for example, is disconnected, if there is light transmission in the remaining cable (or fiber) the apparatus will indicate the presence of that light. The invention does not, therefore, rely on unidirectional devices such as signal splitters.

In another embodiment of the invention, an attenuator for introducing a known amount of loss can be positioned, for example, between the two fiber ends in the connection, and used to guide the light to the photo-diode. Such an arrangement insures that there will always be an LED activated, the absence of which can then be used as an indication of a malfunctioning connection.

In both embodiments, the circuitry can be used to measure the optical power passing through the connection, where desired, without dependence upon signal direction. In addition, the photo-diode can be sensitive enough, and preferably is, to respond to even small amounts of light transmission through the connection to indicate that the connection should not be broken.

The various features and the principles of the present invention will be more readily apparent from the following description, read in conjunction with the drawings.

DETAILED DESCRIPTION

Optical connectors are a mechanical means for connecting a light path, as represented by an optical fiber, to a utilizing device or connecting two fibers end-to-end. One measurement of the performance of such a connection is optical insertion loss $L_i$ which can be defined as $$Li(dB) = 10 \cdot \log \frac{P_{out}}{P_{in}}$$

where $P_{in}$ is the measured power level of an optical signal entering the connection and $P_{out}$ is the optical power exiting the connection. Any light energy which is not coupled via the connector from the source fiber to the receive fiber (or device) is scattered, usually at the junction of the source fiber and the receive fiber. Thus, all of the optical energy can be accounted for by $$P_{in} - P_{out} = P_s \quad (1)$$

where $P_s$ is the scattered power. The power scattered, as a function of the input power is thus given in terms of a dB by $$10 \cdot \log\left(1 - \frac{P_{out}}{P_{in}}\right) = 10 \cdot \log \frac{P_s}{P_{in}} \quad (2)$$

Connector loss, which is, in effect, $P_s$, is usually expressed as $$10 \cdot \log \frac{P_{out}}{P_{in}} \quad (3)$$

which, when substituted in the foregoing, yields $$10 \cdot \log\left(1 - 10 \frac{L_c}{10}\right) - 10 \cdot \log \frac{P_s}{P_{in}} \quad (4)$$

where $L_c$ is connector loss, in dB. From (4) it can be seen that small variations in connector insertion loss produce large variations in scattered loss. For example, for an insertion loss of −0.1 dB, the scattered power is −16.4 dB. For an insertion loss of −0.5 dB, the scatterer is −9.6 dB. Thus, a 0.4 dB change in insertion loss yields a 6.8 dB change in scatttered loss. As discussed in the foregoing, this scattering of light can, and most open does, exceed safe levels.

Figure 1:
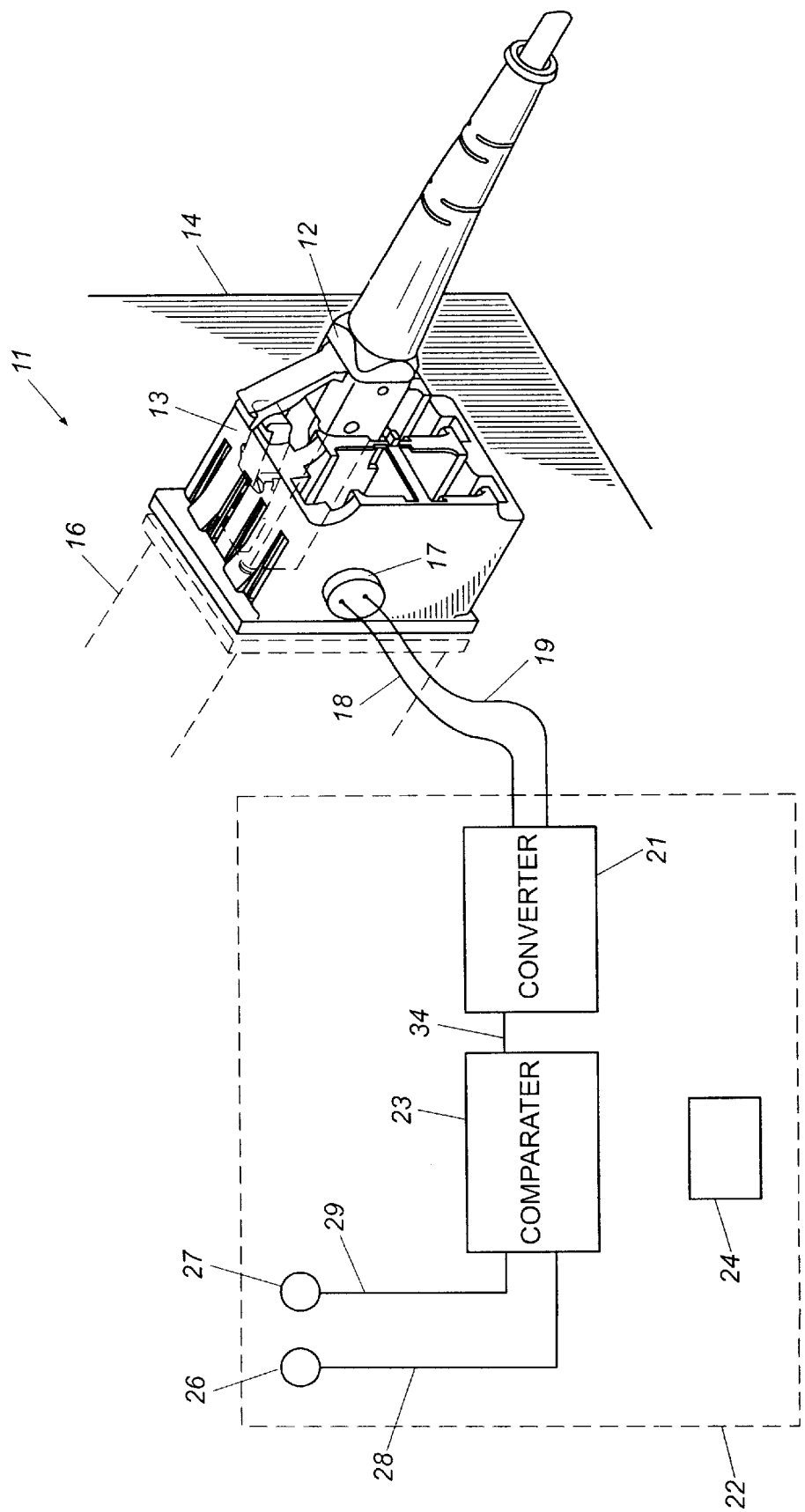
FIG. 1 is a partial perspective view and a block diagram of the apparatus of the invention in a first embodiment thereof.

In FIG. 1 there is shown a connector arrangement 11 which, in accordance with the principles of the present invention, detects light energy scattered at the connection and generates a signal for indicating when the scattered light exceeds safe levels. Assembly 11 comprises a connector 12 of, in this illustration, the LC type, shown inserted in a jack or connector housing 13 which is mounted on a panel 14. A mating connector 16 is partially shown in dashed lines, as being mounted on the other face of panel 14. When the connectors are thus mounted, their fiber carrying ferrules abut, and, as discussed heretofore, light energy is transmitted through the junction which, in all but a perfect alignment of fibers, is partially scattered. Mounted on a wall of housing 13 is a photo-diode or photo-detector 17 which is sensitive to the scattered light including infra-red which impinges thereon to generate a current proportional to the amount of light. Inasmuch as housing 13 is made of plastic, some light energy, e.g., infrared, passes through the wall to the detector 17, which is proportional to the total scattered light at the junction. While detector 17 is shown mounted on a wall of housing 13, it is to be understood that it could be mounted in other locations, such as on the panel 14, so long as it is sufficiently close to the junction of the connection to respond to scattered light therefrom.

The current generated by detector 17 is transmitted via leads 18 and 19 to a current-to-voltage converter 21, which may be, and preferably is, incorporated onto a printed wiring board (PWB) 22, the outline of which is shown in dashed lines. The PWB 22 can be mounted, for example, on the panel 14 or other suitable location, or it may be configured to receive the jack housings 13 and 16 of a connection.

Figure 2:
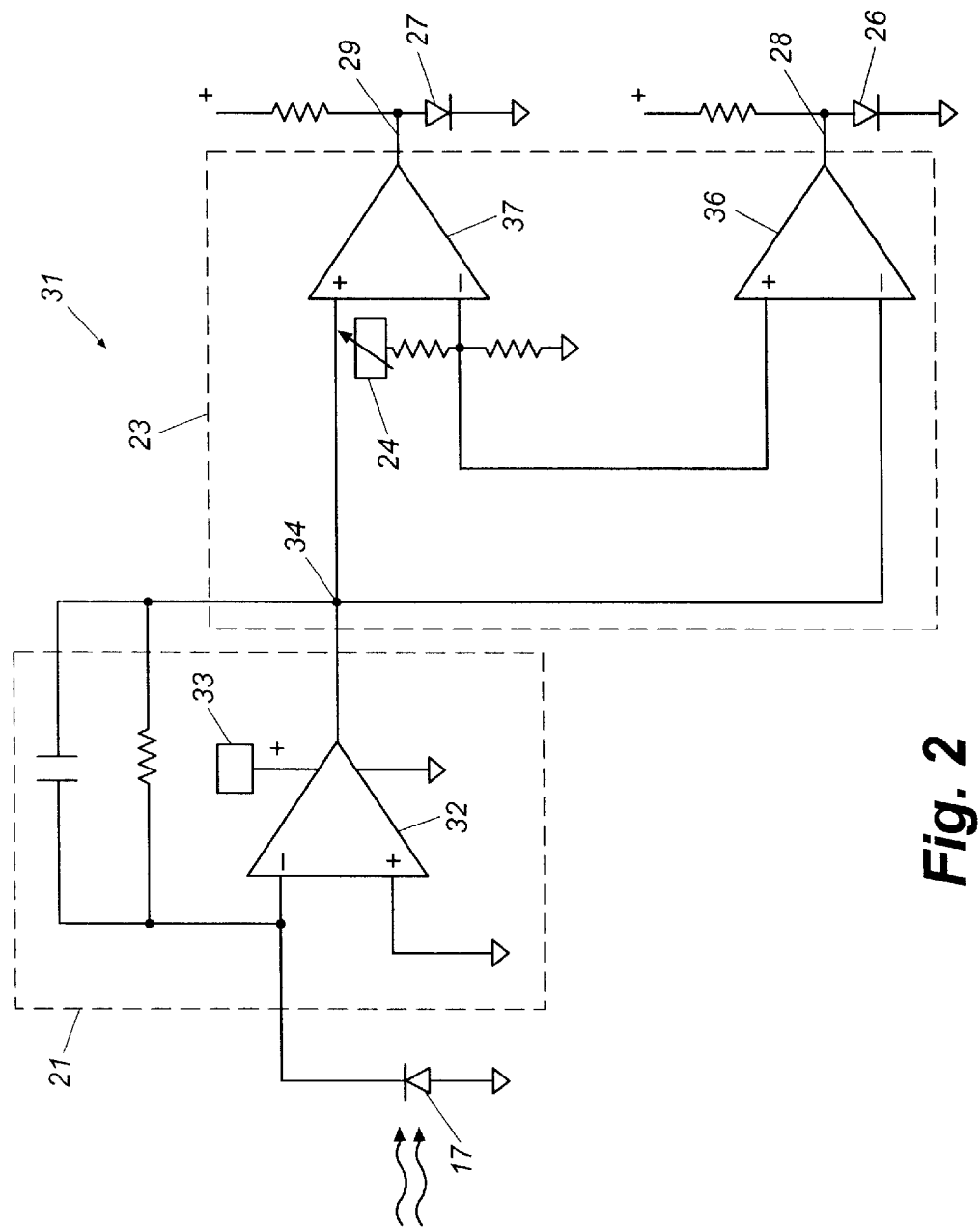
FIG. 2 is a schematic diagram of a circuit for use in the arrangement of FIG. 1.

The voltage output of converter 21 is applied to a comparator circuit 23 which, as will be discussed more fully with regard to FIG. 2, compares the voltage from converter 21, indicative of the scattering, with a reference voltage supplied by a voltage source 24. Comparator circuit 23 applies a first output to an indicator or monitor signaling device 26, such as a greed LED, through lead 28 when the voltage difference is below a threshold, and a second output device 27, such as a red LED, through lead 29, when the voltage difference which exceeds the threshold indicating a hazardous condition of light scatter. As will be seen, only one LED 26,27 is lit at a time. The thresholds may be so chosen that the red LED will light for even small amounts of light transmissions through the coupling, thereby indicating that the circuit should not be broken.

FIG. 2 is a schematic diagram of a circuit 31 for accomplishing the foregoing operation. In circuit 31, the current output of photo-detector 17 is inputted to an op-amp 32 supplied by a voltage source 33 where the current is converted to a voltage in a manner well known in the art and the output of op-amp 32 is applied to an input 34 of the comparator circuit 23. Comparator circuit 23 comprises first and second comparators 36 and 37 which are each supplied with a reference voltage from a variable source 24, as shown, and the output of comparator 36 is connected to green LED 26 and that of comparator 37 to red LED 27. In operation, scattered light causes detector 17 to generate a current indicative of the amount of such light, which is applied to converter 21, where it is converted to a voltage indicative of the amount of scattered light. This voltage, in turn, is applied to input 34 of the comparator circuit 23. Source 24 applies a reference voltage of a magnitude indicative of the threshold level above which the scattered light is unsafe to the positive terminal of comparator 36. This voltage activates LED 26 (green) to show that a safe condition exists. At the same time the voltage from source 24 is applied to the negative terminal of comparator 37 which is then biased in a non-condition, hence LED 27 (red) remains off. If the scattering voltage input increases to where it exceeds the threshold voltage, the output of comparator 36 ceases and LED 26 turns off. At the same instant comparator 37 produces an output which turns LED 27 on, the red light thereof indicating an unsafe condition.

The arrangement of the invention also functions to detect an open connection, i.e., one in which one of the fibers is actively transmitted optical signals in the absence of the other conductor. The light emitted from the fiber is detected as scattered light, and an unsafe condition indicated. The arrangement is bi-directional, i.e., it doesn't matter which fiber is transmitting, there will be an indication from, for example, the LEDs 26 and 27. It can be appreciated, therefore, that whenever there is light scattering, whether from the associated connection or from the absence of a connection, it will be detected, measured, and a safe or unsafe condition indicated. It is to be understood that other means than LEDs may be employed to indicate or to react to the light scattering to insure safety for personnel in the vicinity. With modification, the circuitry on the PWB may be used to give an indication of the optical power being transmitted, making use of the bi-directionality characteristic and the lack of any necessity for signal splitting (invasive operation).

Figure 3:
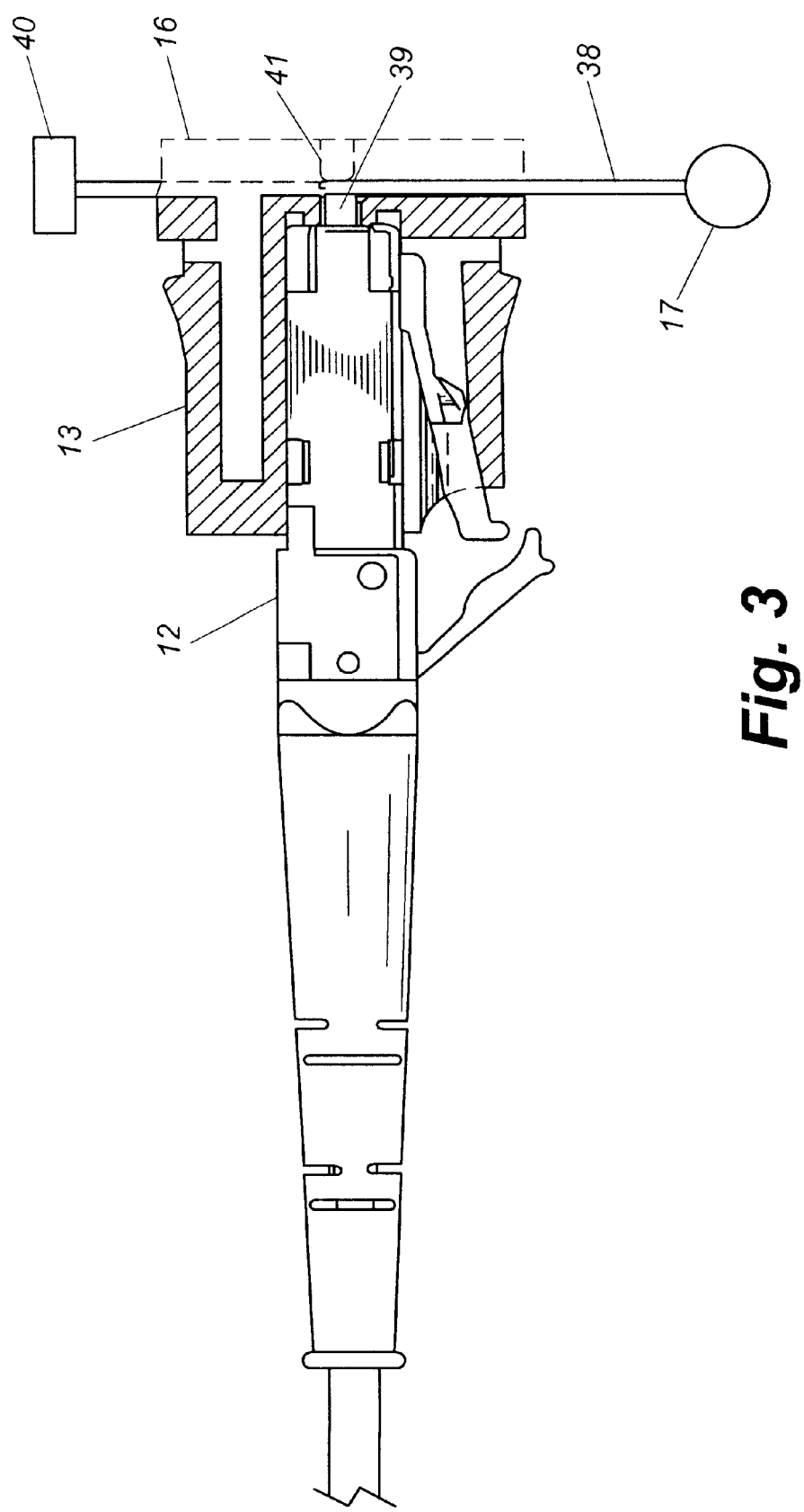
FIG. 3 is a partial cross-sectional view of a second embodiment of the invention.

As was pointed out in the foregoing, an ideal connection, i.e., little or no light scatter, is seldom realized. However, there is always the possibility that a perfect or near perfect connection might be achieved, which case the circuitry or FIG. 2 would yield a green LED indication. However, it would not be known if there was optical power being transmitted through the connection or not. Thus it is desirable that there be some means of indicating the presence of light even though the connection is near perfect. In FIG. 3 there is shown a modification to the system of FIGS. 1 and 2 that insures determination of the presence of light. For ease of understanding, corresponding parts in FIG. 3 bear the same reference numerals as in FIG. 1. The embodiment of FIG. 3 has an acrylic strip 38 interposed between ferrules 39 and 41 of connector 12 and a mating connector, not shown. Strip 38 is preferably mounted in the housing 13 or 16, or, where there is a one piece housing, within that housing in position to interpose between the two ferrule ends. Acrylic attenuators, interposed between the ferrule ends, are used in the prior art where attenuation of the signal crossing the junction is desired, for whatever reason. In the arrangement of FIG. 3, strip 38 supplies a known finite amount of attenuation and, being light conductive, albeit not transparent thereto, conducts the finite amount of light to detector 17. The threshold levels of the comparators 36 and 37 can be set such that in the absence of any light, green LED 26 does not light, but, in response to the light in strip 38 reaching detectors 17, it does light, indicating the existence of light transmission through to junction. The arrangement of FIG. 3 thus insures that the presence of light at the junction is always indicated, regardless of the efficiency of the connection. Although a small amount of "light scattering" is thus induced, its magnitude is insufficient to have any material effect on the signal power, as opposed to prior art arrangements. The arrangement of FIG. 3 also may include a laser or other light source 40 which strip 38 is connected, to conduct light directly to detector 17, the level of laser light can be varied to test the operation of the monitor circuit.

Figure 4:
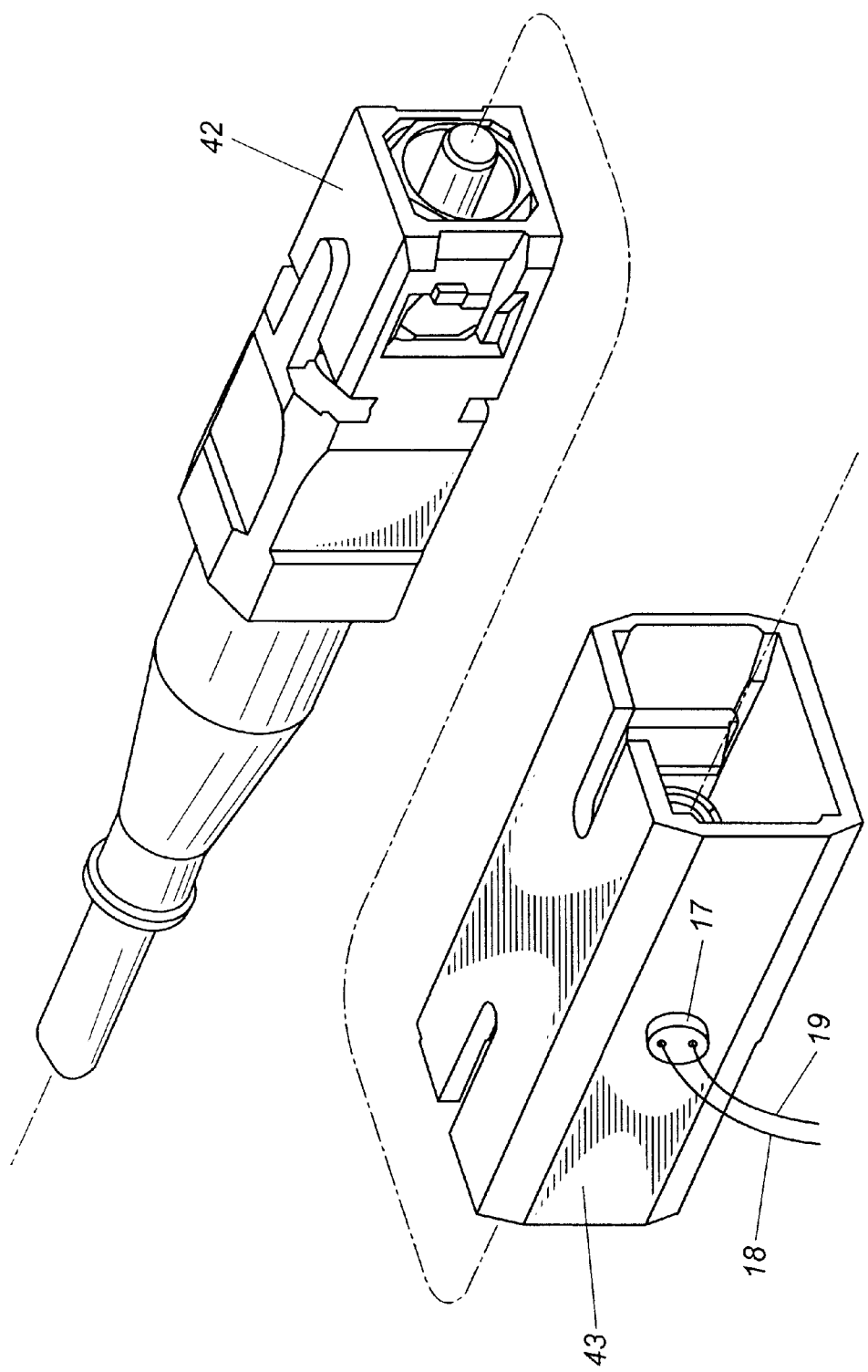
FIG. 4 is a perspective exploded view showing the applicability of the invention to a different type optical fiber connector.

In the embodiment of the invention shown in FIGS. 1 and 3, each connector is shown in its own separate housing 13 and 16, flanged to facilitate mounting to a panel 14. It is, therefore, difficult to position detector 17 exactly opposite the junction of the fiber ends, the closest location. However, the sensitivity of the detector 17 which may be, for example, energy above −30 dB at 1100 nm to 1700 nm wavelength, is sufficient that it may be located as shown in FIG. 1. The detector 17 may have other values of sensitivity, threshold and frequency range, depending upon the particular circuit application. In FIG. 4, on the other hand, there is shown an SC type connector 42 and its associated jack housing 43 which is made of one piece and receives connectors at each end. As a consequence of this configuration, detector 17 can be located approximately opposite the junction defined by the ferrules of the two connectors.

From the foregoing it can be seen that the invention comprises a simple, non-invasive, bi-directional connection monitor which substantially increases the safety for personnel in the vicinity. It is to be understood that the various features of the present invention might be incorporated into other types of monitors, and that other modifications or adaptations might occur to workers in the art. All such variations and modifications are intended to be included herein as being within the scope of the invention as set forth. Further, in the claims hereinafter, the corresponding structures, materials, acts, and equivalents of all means or step-plus-function elements are intended to include any structure, material, or acts for performing the functions in combination with other elements as specifically claimed.

What is claimed is:

1. An optical fiber connection monitoring system for use with optical fiber connections which comprise at least one connector member having a fiber containing ferrule and a ferrule end at least partially defining a connection junction and a housing member for receiving the connector, said monitoring system comprising:

a detector member located in the vicinity of said connection junction for directly detecting optical radiation emitted from the ferrule end and impinging thereon and generating a signal in response thereto indicative of the magnitude of the radiation;

a comparator circuit for determining the difference in magnitude between the generated signal and a threshold value; and at least one indicator member connected to an output of said comparator circuit for indicating when the signal magnitude is less than the threshold or exceeds the threshold value.

2. The monitoring system as claimed in claim 1 and having a first indicator member for indicating when the signal magnitude is less than the threshold and a second indicator member for indicating when the signal magnitude exceeds the threshold.

3. The monitoring system as claimed in claim 1 and further comprising:

a current-to-voltage converter circuit for converting the signal from said detector to a voltage and applying the voltage to an input of said comparator circuit.

4. The monitoring system as claimed in claim 3 wherein said comparator circuit and said converter circuit are mounted on a printed wiring board.

5. The monitoring system as claimed in claim 1 wherein said detector is mounted on the housing member in the area of the ferrule end.

6. The monitoring system as claimed in claim 4 wherein said detector is mounted on said printed wiring board.

7. The monitoring system as claimed in claim 1 and further comprising a light conducting impedance member connected between the ferrule end and said detector.

8. The monitoring system as claimed in claim 7 wherein said light conducting impedance member is an acrylic.

9. The monitoring system as claimed in claim 7 wherein said light conducting impedance member further extends from the ferrule end to a light source.

10. The monitoring system as claimed in claim 2 wherein said first indicating member and said second indicating member are light emitting diodes.

11. The monitoring system as claimed in claim 10 wherein said first indicating member emits green light when the signal magnitude is less than said threshold value.

12. The monitoring system as claimed in claim 10 wherein said second indicating member emits red light when the signal magnitude is greater than said threshold.

13. A method of monitoring an optical fiber connection comprising:

detecting the presence or absence of optical radiation emitted from the connection by means of a detector positioned to be impinged by the radiation;

generating an electrical signal indicative of the amount of radiation detected and applying the signal then generated to a current to voltage converter to produce a voltage level signal indicative of the optical radiation level;

applying the voltage level signal to a comparator circuit;

comparing the voltage level signal to a predetermined safety threshold voltage level; and indicating whether the voltage level signal exceeds the threshold level and is consequently unsafe.

\* \* \* \* \*